US008851705B2

(12) United States Patent
Miura

(10) Patent No.: US 8,851,705 B2
(45) Date of Patent: Oct. 7, 2014

(54) LASER LIGHT SOURCE APPARATUS

(75) Inventor: Yuichi Miura, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 175 days.

(21) Appl. No.: 13/328,533

(22) Filed: Dec. 16, 2011

(65) Prior Publication Data

US 2012/0155079 A1 Jun. 21, 2012

(30) Foreign Application Priority Data

Dec. 16, 2010 (JP) ................................. 2010-280027

(51) Int. Cl.
F21V 5/02 (2006.01)
H04N 9/31 (2006.01)
G03B 21/20 (2006.01)
G02B 27/48 (2006.01)
G02B 26/00 (2006.01)

(52) U.S. Cl.
CPC ............ G02B 26/002 (2013.01); H04N 9/3161 (2013.01); G03B 21/2033 (2013.01); G02B 27/48 (2013.01); G02B 2207/117 (2013.01)
USPC ....... 362/235; 362/227; 362/249.02; 362/259

(58) Field of Classification Search
CPC .. G02B 2207/117; G02B 6/002; G02B 27/48; G03B 21/2033; H04N 9/3161
USPC .............................. 362/227, 235, 249.02, 259
See application file for complete search history.

(56) References Cited

U.S. PATENT DOCUMENTS

| 3,917,380 A * | 11/1975 | Kato et al. ........................ 359/35 |
| 8,416,363 B2 * | 4/2013 | Shikii et al. ..................... 349/62 |
| 2008/0123056 A1 | 5/2008 | Matsubara |
| 2008/0247022 A1 | 10/2008 | Yamauchi et al. |
| 2010/0007934 A1 | 1/2010 | Tokui |

FOREIGN PATENT DOCUMENTS

| JP | 2008-134271 A | 6/2008 |
| JP | 2008-216923 A | 9/2008 |
| JP | 4379482 B2 | 12/2009 |
| JP | 2010-152178 A | 7/2010 |
| WO | WO-2008/088001 A1 | 7/2008 |

OTHER PUBLICATIONS

Office Action issued in Japanese Patent Application No. 2010-280027 dated Apr. 4, 2014.

* cited by examiner

*Primary Examiner* — Stephen F Husar
*Assistant Examiner* — James Cranson, Jr.
(74) *Attorney, Agent, or Firm* — Rader, Fishman & Grauer PLLC

(57) ABSTRACT

A laser light source apparatus comprises a laser light source that emits laser light; a prism with one optical flat face, through which the laser light from the laser light source passes, that is perpendicular to an optical path of the laser light; and a vibration driving device that vibrates the prism to move the prism parallel to a direction in which an optical path length of the laser light in the prism changes, along a flat face located in the other optical flat face that does not intersect perpendicularly with the optical path of the laser light in the prism.

6 Claims, 4 Drawing Sheets

LASER LIGHT SOURCE APPARATUS

CROSS-REFERENCES TO RELATED APPLICATION

This application claims priority from Japanese Patent Application Serial No. 2010-280027 filed Dec. 16, 2010, the contents of which are incorporated herein by reference in their entirety.

TECHNICAL FIELD

The present invention relates to a laser light source apparatus used as a light source of, for example, a projector apparatus.

BACKGROUND

A projector apparatus is used as an image projection apparatus, which uses, for example, a liquid crystal panel or a DMD (Registered Trademark) device, and techniques of using laser light as a light source for a projector apparatus have been developed.

However, when such a laser light source apparatus is used as a light source in a projector apparatus, garish flickering, which is called a "speckle noise," is observed on a screen. This phenomenon occurs because lights in phase interfere with each other and non-uniformity of the strength of light intensity arises on a retina. When laser light, which is coherent light, is projected on a screen or the like, such phenomenon can be observed from the obtained image light.

In the past, various approaches have been proposed as a method of reducing speckle noise. For example, Japanese Patent Application Publication No. 2008-134271 teaches a method, in which laser light from a light source, is split into S polarization and P polarization, and a phase difference is generated by changing travelling distances of the lights and the lights are synthesized again, whereby speckle noise is reduced. Moreover, Japanese Patent Application Publication No. 2008-216923 teaches a method of reducing speckle noise where an optical path difference changes in terms of time by rotating a deformation conical prism that is formed by combining conical prisms. Japanese Patent No. 4379482 teaches a method of reducing speckle noise by changing an optical path in terms of time.

However, when these methods of changing an optical path are used to reduce speckle noise, a pseudo situation where the size of a light source becomes large is caused so that there is a problem that the utilization factor of light decreases (Etendue ($\Omega$S) becomes large).

SUMMARY

The described is made in view of the above situations, and it is an object of the described to offer a laser light source apparatus, which is used as, for example, a light source of a projector apparatus and is capable of reducing speckle noise without reducing brightness.

A laser light source apparatus comprising a laser light source that emits a laser light; a prism including a first optical flat face that is perpendicular to an optical path of the laser light and a second optical flat face that is not perpendicular to the optical path of the laser light; and a vibration driving device that vibrates the prism a direction parallel to a direction where an optical path length in the prism of the laser light changes.

Further, a laser light source apparatus may comprise a laser light source that emits a laser light; a prism including a plurality of sub-prisms arranged in a first direction, wherein each of the plurality of sub-prisms have a first optical flat face and a second optical flat face that form an apex angle, wherein the second optical flat face of each sub-prism is located on a first plane, wherein each first optical flat face of each sub-prism is located on a different parallel plane of a set of parallel planes, and wherein either the first plane or the set of parallel planes is perpendicular to an optical path of the laser light emitted from the laser light source; and a vibration driving device that vibrates the prism in a second direction that changes an optical path length in the prism of the laser light.

Furthermore, the prism may be vibrated so that laser light draws a circular trace on either the first optical flat face or the second optical flat face of the prism or any of the plurality of sub-prisms.

Moreover, the laser light source apparatus according to any one of claims 1-3, wherein the laser light source is a plurality of laser light sources that respectively emit a plurality of laser lights with parallel optical paths that enter the prism.

BRIEF DESCRIPTION OF THE DRAWINGS

Other features and advantages of the described will be apparent from the ensuing description, taken in conjunction with the accompanying drawings, in which.

DESCRIPTION

Accordingly, to the laser light source apparatus includes a prism is arranged so that the one of the optical flat faces, through which the laser light from the laser light source passes, is perpendicular to the optical path of the laser light. The prism is vibrated by the vibration driving device, so that the prism is moved in parallel with a direction where the optical path length of the laser light in the prism changes, which is a direction along a flat face location in which the other optical flat face that is not perpendicular to the optical path of the laser light in the prism is located, whereby it is possible to reduce speckle noise. The speckle noise is reduced because a phase difference in the laser light is generated by the vibration, in terms of time or a phase difference in terms of time and space, so that interference of the laser light is reduced. In addition, since a vibration of the prism is performed on a condition where the position of an emission point of the laser light is not changed, it is possible to prevent a brightness decrease.

Description of embodiments of the described will now be given below in detail.

First Embodiment

Figure 1:
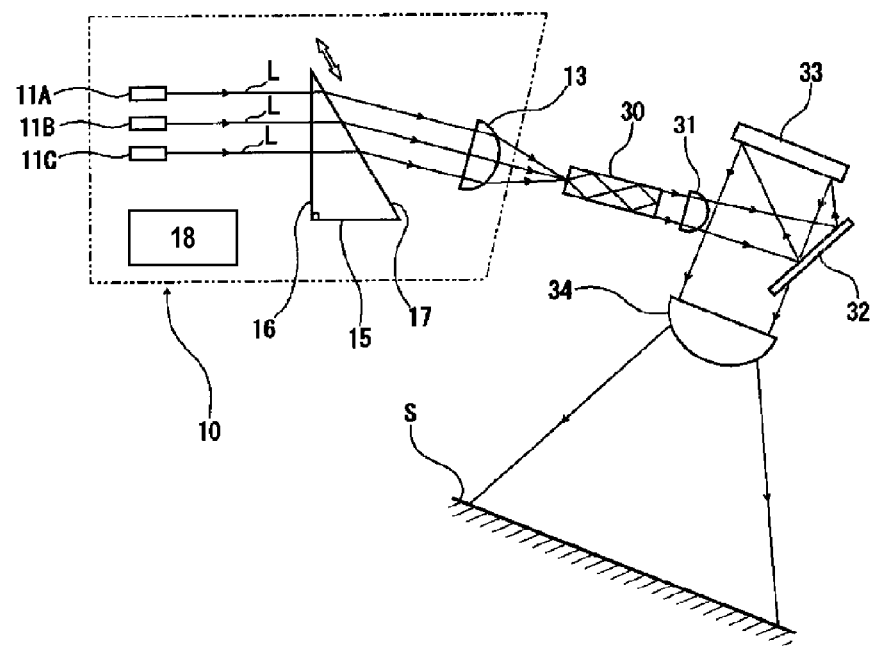
FIG. 1 is an explanatory schematic diagram showing an example of the structure of a projector apparatus equipped with a laser light source apparatus according to a first embodiment.
Figure 2:
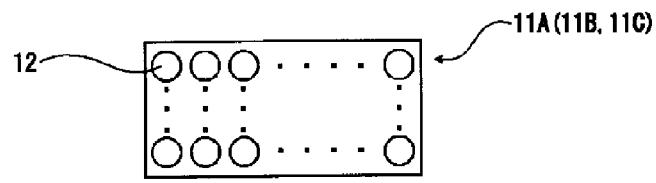
FIG. 2 is an explanatory schematic diagram showing an example of the structure of a laser light source, which forms a laser light source apparatus.

FIG. 1 is an explanatory schematic diagram showing an example of the structure of a projector apparatus equipped with a laser light source apparatus according to a first embodiment. FIG. 2 is an explanatory schematic diagram showing an example of the structure of a laser light source, which forms a laser light source apparatus.

This projector apparatus comprises a laser light source apparatus 10; a rod shape integrator lens 30, which emits light having uniform luminance, based on laser light L, which is projected from the laser light source apparatus 10; a collimator lens 31 that collimates laser light based on the laser light, which is emitted from the integrator lens 30; a reflective mirror 32 that reflects the laser light emitted from the collimator lens 31, so that the reflected light may enter a display device 33 such as DMD (Registered Trademark); and a projection lens 34, by which the image light modulated and formed in the display device 33 is amplified and projected on a screen S.

The laser light source apparatus 10 according to the embodiment, comprises a plurality of laser light sources 11A, 11B, and 11C, which project red light, green light, and blue light respectively; a common prism which the laser lights L from the light sources 11A, 11B, and 11C enter, wherein the lights are projected in parallel to one another; and a condensing lens 13 that condenses the laser lights concerning the respective laser light sources 11A, 11B, and 11C and emitted from the prism and that makes the condensed light enter the integrator lens 30. In each of the laser light sources 11A, 11B, and 11C, for example, as shown in FIG. 2, two or more laser components 12 are two-dimensionally arranged in a shape of an array (in a matrix in a plane). Specifically, a semi-conductor laser array can be used as the laser light source 11A that projects red light. A wave-length adjustable (SHG) laser array that modifies the wave length of infrared light can be used as the laser light source 11B that projects green light and the laser light source 11C that projects blue light.

Figure 3A:
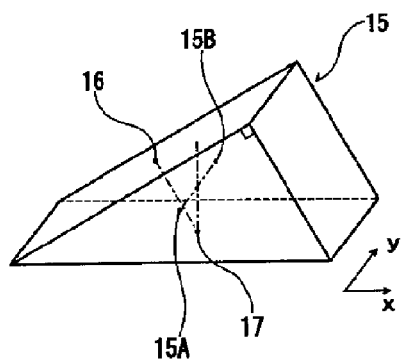
FIG. 3A is a schematic perspective view of an example of the structure of the prism, which forms a laser light source apparatus.
Figure 3B:
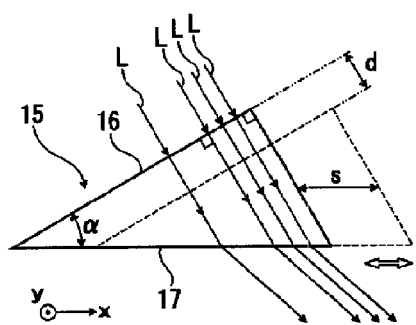
FIG. 3B is a bottom view of an example of the structure of the prism, which forms a laser light source apparatus.

FIG. 3A is a schematic perspective view of an example of the structure of the prism, which forms a laser light source apparatus. FIG. 3B is a bottom view of an example of the structure of the prism, which forms a laser light source apparatus. For example, as shown in FIGS. 3A and 3B, a right angled triangle prism 15 is used as the prism according to this embodiment. In this right angled triangle prism 15, one of two optical flat faces forming an apex angle α (a flat face including the long side of the right angled triangle which forms a bottom face 15A or 15B), serves as a laser light incident face 16 that the laser lights L from the laser light sources 11A, 11B, and 11C enter. Moreover, the other optical flat face (a flat face including the hypotenuse of the right angled triangle which forms a bottom face 15A or 15B) serves as a laser light emitting face 17 from which laser light propagating inside the prism 15 is emitted.

For example, the laser light incidence face 16 is provided to intersect perpendicularly to the optical paths of the laser lights L from the laser light sources 11A, 11B, and 110.

In addition, the above laser light source apparatus 10 has a vibration driving device 18 that vibrates the right angled triangle prism 15 to move the prism 15 in parallel to a direction where the optical path length of the laser light in the right angled triangle prism 15 changes or along a flat face where the laser light emitting face 17 that is not perpendicular to the optical paths of the laser lights. The vibration driving device 18 according to the embodiment is configured to vibrate the right angled triangle prism 15, so that a linear reciprocating motion may be carried out in the flat face (an x-y plane), where the laser light emitting face 17 is located, in directions (left and right directions in FIG. 3B, x directions) where the hypotenuse of the right angled triangle, which forms each of the bottom faces 15A and 15B, extends. For example, a device, in which rotary motion of a motor is converted into a linear reciprocating motion by a cam, may be used.

For example, the frequency of vibration of the right angled triangle prism 15, which is vibrated by the vibration driving device 18, is desirably 10 Hz or more (the number of times of back-and-forth motions during a period of one (1) second is 10 or more). Thus, a speckle noise reduction effect can be ensured, as shown in a result of the experimental example described below. Moreover, the amplitude s (a maximum travel distance in the x direction) of the right angled triangle prism 15 is desirably such that phase difference in terms of time in laser light of each color (difference d of the optical path length in the right angled triangle prism 15) can be certainly formed.

In the laser light source apparatus 10, two or more laser lights L, which are parallel to each other and are respectively emitted from the laser light sources 11A, 11B, and 11C, enter the laser light incident face 16 of the vibrated right angled triangle prism 15, so that a linear reciprocating motion may be carried out by the vibration driving device 18 in the direction x along the flat face (x-y plane) where the laser light emitting face 17 is located. Thus, in the laser lights that advance on the same optical path, the laser lights having respectively different optical path lengths, which propagate inside the right angled triangle prism 15, are synthesized in terms of time, to be emitted from the laser light emitting face 17. Therefore, according to the above laser light source apparatus 10, the right angled triangle prism 15 is arranged so that the one of the optical flat faces, for example, the optical flat face forming the laser light incident face 16, may intersect perpendicularly to the optical path of the laser lights from the laser light sources 11A, 11B, and 11C. Moreover, the right angled triangle prism 15 is vibrated by the vibration driving device 18, to move the prism 15 in parallel to a direction where the optical path length of the laser light in the right angled triangle prism 15 changes, along the flat face located in the other optical flat face forming the laser light emitting face 17, whereby speckle noise on a screen S can be reduced since it is possible to reduce interference of the laser lights by forming phase difference in terms of time in the laser light L from the laser light sources 11A, 11B, and 11C. In addition, since a vibration of the right angled triangle prism 15 is performed on the condition where the position of an emission point of laser light (optical path) is not changed, it is possible to prevent a brightness decrease.

Figure 4A:
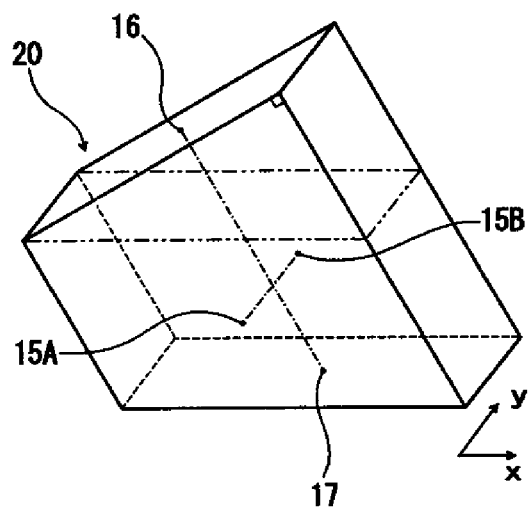
FIG. 4A is a schematic perspective view of another example of the structure of a prism, which forms a laser light source apparatus.
Figure 4B:
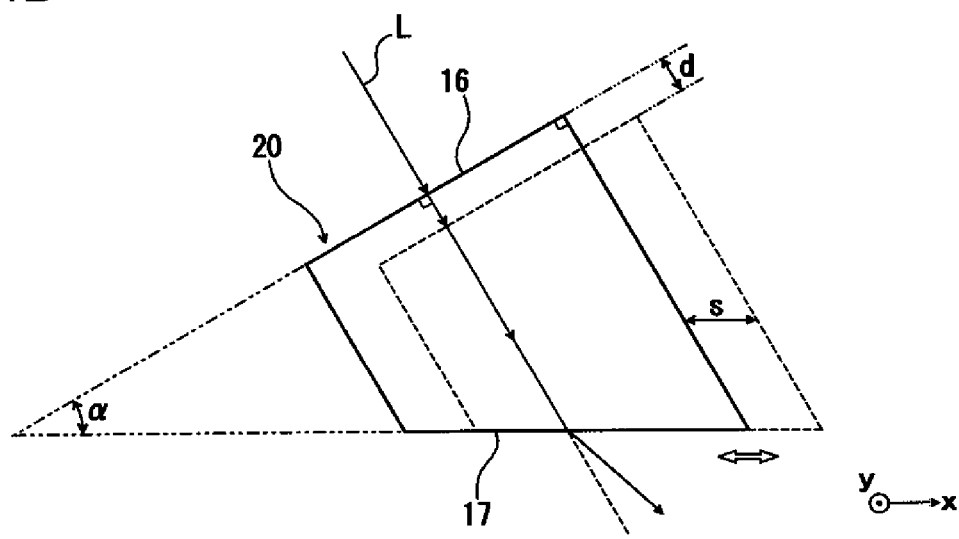
FIG. 4B is a bottom view of another example of the structure of a prism, which forms a laser light source apparatus.

FIG. 4A is a schematic perspective view of another example of the structure of a prism, which forms a laser light source apparatus. FIG. 4B is a bottom view of another example of the structure of a prism, which forms a laser light source apparatus. Although the structure, in which the right angled triangle prism 15 is used as a prism, is described above, a trapezoid prism 20 as shown in FIGS. 4A and 4B may be used. This trapezoid prism 20 has the same shape as that shown in, for example, FIGS. 3A and 3B, except that part of the right angled triangle prism which has two optical flat faces forming an apex angle α is taken along a cutting plane parallel to a flat face, which includes the short side of the right angled triangle, forming a bottom face of the right angled triangle prism.

In this trapezoid prism 20, similarly to that shown in FIGS. 3A and 3B, one of the two optical flat faces forming an apex angle α (a flat face including the long side of the right angled triangle which forms a bottom face 15A or 15B), serves as a laser light incident face 16 that the laser light L from the laser light sources 11A, 11B, and 11C enter. Moreover, the other optical flat face (a flat face including the hypotenuse of the right angled triangle which forms a bottom face 15A or 15B) serves a laser light emitting face 17, from which laser light propagating inside the prism 20 is emitted. For example, the laser light incidence face 16 is provided to intersect perpendicularly to the optical path of the laser lights L from the laser light sources 11A, 11B, and 11C. Further, the prism is vibrated by a vibration driving device 18, to move the prism in parallel to directions (x directions) where the optical path length of the laser light in the trapezoid prism 20 changes, along a flat face (an x-y plane) where the laser light emitting face 17 is located.

In the laser light source apparatus equipped with such a trapezoid prism 20, it is possible to obtain effects similar to those of the above mentioned embodiment in which the right angled triangle prism 15 is used as a prism.

Second Embodiment

Figure 5:
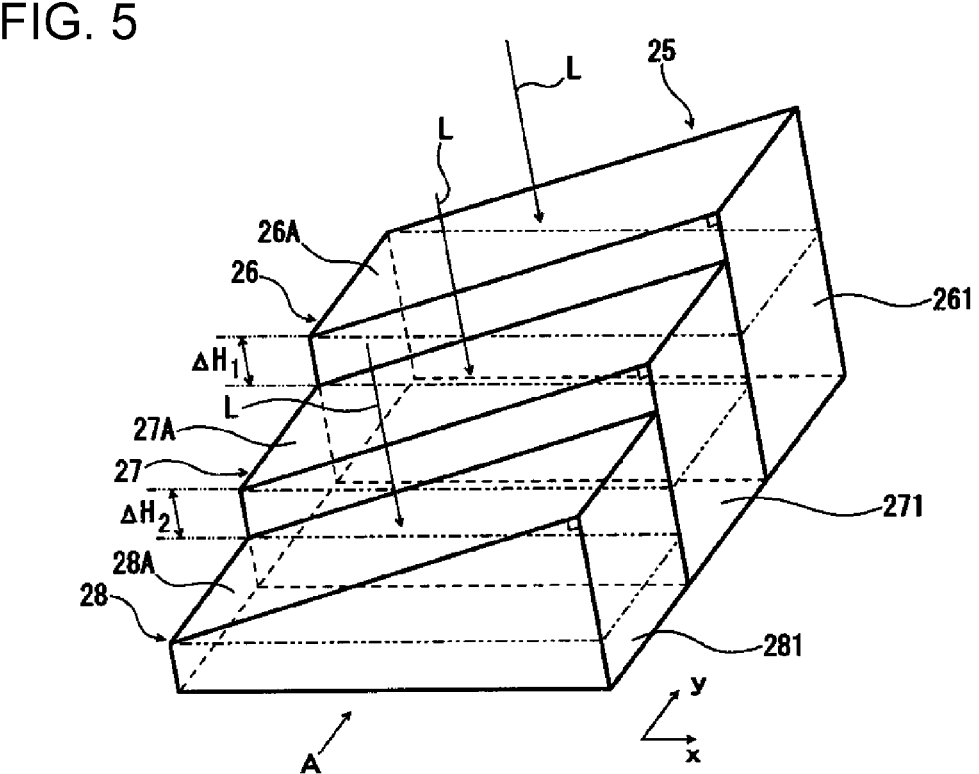
FIG. 5 is a schematic perspective view of an example of the structure of a prism that forms a laser light source apparatus according to a second embodiment.
Figure 6:
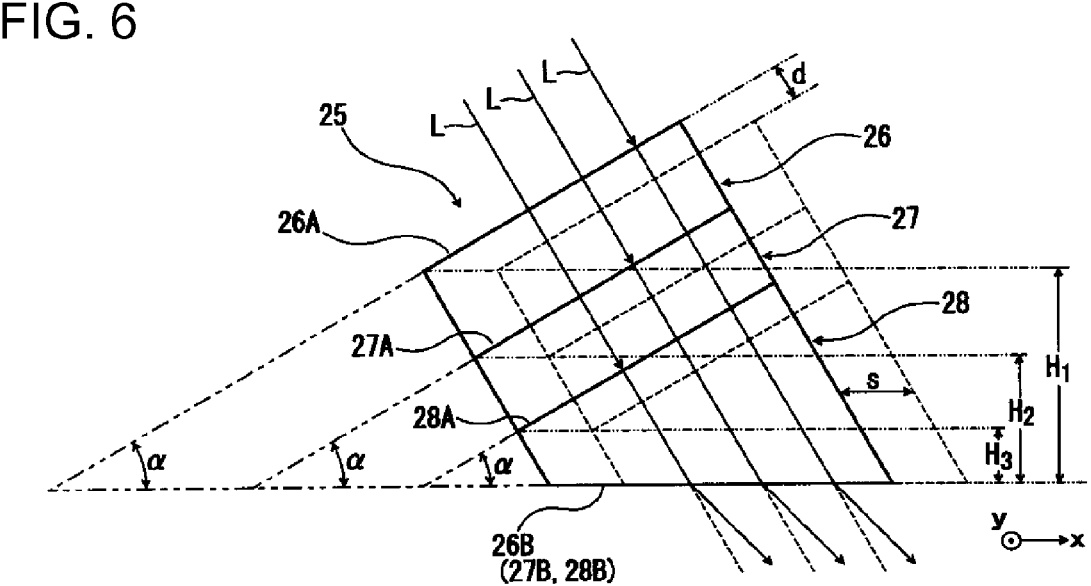
FIG. 6 is a bottom view of an example of the structure of a prism that forms a laser light source apparatus according to a second embodiment, which is viewed from a direction A of FIG. 5.

FIG. 5 is a schematic perspective view of an example of the structure of a prism that forms a laser light source apparatus according to a second embodiment. FIG. 6 is a bottom view of an example of the structure of a prism that forms a laser light source apparatus according to a second embodiment, which is viewed from a direction A of FIG. 5. The prism, which forms the laser light source apparatus according to the second embodiment, comprises a compound prism, in which, for example, three prism components 26, 27, and 28 are arranged closely to one another in a height direction of the prism components (a direction vertical to a paper sheet showing FIG. 6). Each of the three prism components 26, 27, and 28 has two optical flat faces that form an apex angle α, and while each of the one optical flat faces 26B, 27B, and 28B of the prism components is located on the same flat face, the other optical flat faces 26A, 27A, and 28A of the prism components differ from one another in level. That is, each level is on a different parallel plane. Each prism component 26 (27, 28) of the compound prism 25, is a trapezoid prism, which is formed by, for example, taking away part of the right angled triangle prism which has two optical flat faces forming the apex angle α, along a cutting plane parallel to a flat face, which includes the short side of the right angled triangle, forming a bottom face of the right angled triangle prism. The heights H1, H2, and H3 of parallelogram prism portions 261, 271, and 281, in a direction vertical to one of each optical face (upper and lower directions which are vertical to a paper sheet showing FIG. 6), are different from one another.

In this compound prism 25, while the other optical flat faces of the prism components 26, 27, and 28 respectively serve as the laser light incidence faces 26A, 27A, and 28A that the laser lights L from laser light sources 11A, 11B, and 11C enter, the other optical flat faces (each of which is a flat face including the hypotenuse of the right angled triangle including a bottom face) respectively serve as the laser light emitting faces 26B, 27B, and 28B from which the laser lights propagating inside the prism components 26 and 27 and 28 are emitted. For example, the optical flat faces, which form the laser light incidence faces 26A, 27A, and 28A are provided to intersect perpendicularly to the respective optical paths of the laser lights L from the laser light sources 11A, 11B, and 11C, and the prism is vibrated by a vibration driving device 18, to move the prism in parallel to an x direction, a y direction, both directions, or along a flat face (an x-y plane) located in the laser light emitting faces 26B, 27B and 28B. When the compound prism 25 is vibrated to be moved in parallel to the x direction, the optical path lengths of the laser lights advancing on the same optical paths in the respective prism components 26, 27, and 28 change. On the other hand, where the compound prism 25 is vibrated in parallel to the direction y, the optical path lengths change when the laser lights, which advance on the same optical path, passes through a different prism component.

In the embodiment, a difference (ΔH1=H1−H2) between the height of the prism component 26 and that of the prism component 27, and a difference (ΔH2=H2−H3) between the height of the prism component 27 and that of the prism component 28, are desirably a difference d in the optical path length or more where the difference d is one that is produced when a linear reciprocating motion is carried out, for example, in the x directions in an x-y plane, and the compound prism 25 is moved by a maximum travel distance s in the x direction.

In the laser light source apparatus equipped with such a compound prism 25, it is possible to obtain effects similar to those of the first embodiment, that is, it is possible to form phase difference in the laser lights from the laser light sources in terms of time and space, thereby reducing interference of the laser lights, so that it is possible to reduce speckle noise on a screen. In addition, since a vibration of the compound prism 25 is performed under a condition where the position of an emission point of the laser light is not changed, it is possible to prevent brightness thereof from decreasing.

When such a compound prism 25 is used, the vibration driving device 18 is not limited to those which are configured to vibrate the compound prism 25 so as to perform a linear reciprocating motion along a flat face where the optical face does not perpendicular with the optical path of the laser light.

Figure 7:
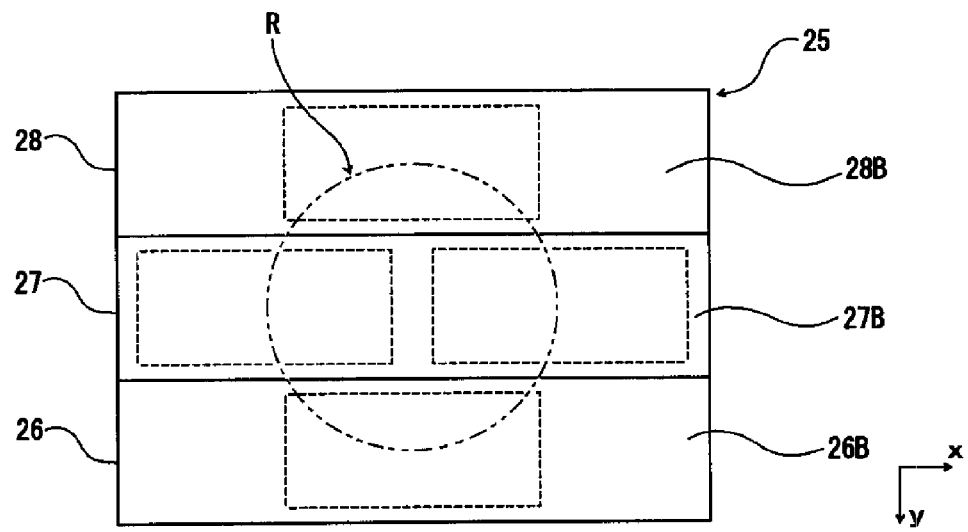
FIG. 7 is a plane view of a prism, which is viewed from a laser light emitting face side, that illustrates a vibration method of the prism shown in FIG. 5.

FIG. 7 is a plane view of a prism, which is viewed from a laser light emitting face side, that illustrates a vibration method of the prism shown in FIG. 5. As shown in FIG. 7, the described is preferably configured to vibrate the compound prism 25, along with a flat face (an x-y plane) in which the laser light emitting faces 26B, 27B, and 28B are located, so that the laser light emission point may draw a circular trace R (which is shown in two dots and dash line in FIG. 7) on laser light emitting faces 26B, 27B, and 28B or laser light incidence faces 26A, 27A, and 28A. In the vibration driving device 18 of such a structure, there is an incidental effect that a vibration of the compound prism 25 can be easily controlled. In addition, in FIG. 7, an area surrounded by a broken line shows an area where laser light may pass through.

Figure 8:
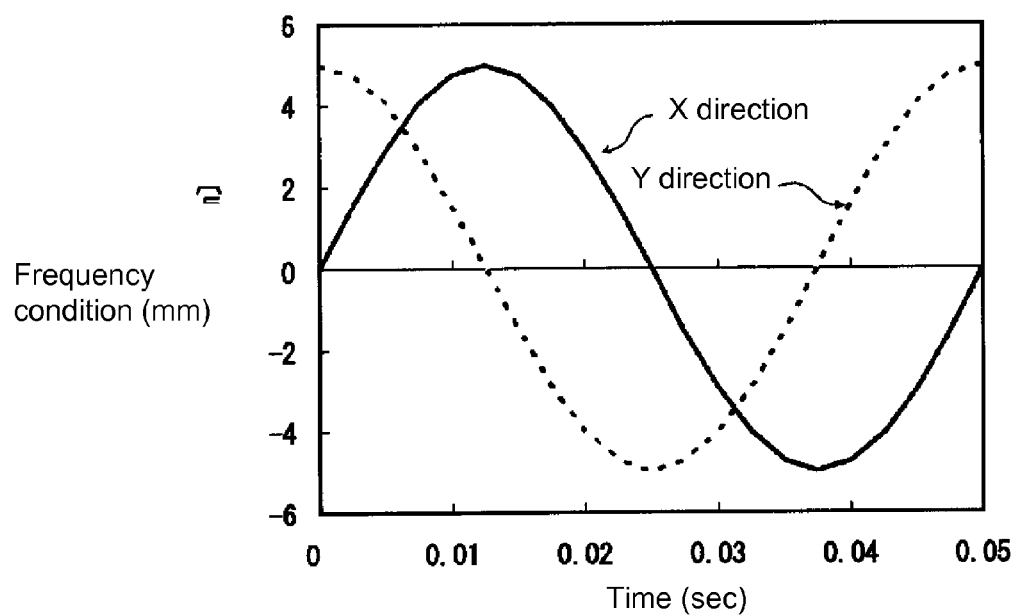
FIG. 8 is a diagram showing an example of a frequency condition for the prism shown in FIG. 5.

The frequency of vibration of the compound prism 25, which is vibrated by the vibration driving device 18, is desirably 10 Hz or more (the number of rotations during a period of one (1) second is 10 or more), whereby, a speckle noise reduction effect can be certainly acquired. FIG. 8 is a diagram showing an example of a frequency condition for the prism shown in FIG. 5. Specifically, FIG. 8 is a diagram showing an example of a frequency condition of such a compound prism 25. This condition is such that a circular motion of the compound prism 25 may be carried out at frequency of 20 Hz so that the laser light emission point may draw a trace of a circle with a radius of 5 mm on the laser light emitting faces 26B, 27B, and 28B.

Although the embodiments are explained above, the described is not limited to these embodiments, and modification thereto can be variously made. For example, the shape of the prism is not limited to those described above. Moreover, the prism may be formed so that an optical flat face which intersects perpendicularly with the optical path of the laser light in a prism serves as a laser light emitting face, and the other optical flat face which does not intersect perpendicularly with the optical path serves as a laser light incidence face. Moreover, as long as the prism is configured to be vibrated so that the optical path length in the prism may be changed under the condition where the position of the laser light emission point (optical path) is not changed, the direction (traveling direction), in which the prism is vibrated, is not limited to that described in the above embodiment.

<Specification of Laser Light Source Apparatus>

Hereafter, description of an experimental example, which was conducted to confirm the effects of the present invention, will be given below. A projector apparatus equipped with a laser light source apparatus (10) of the present invention was made according to the structure shown in FIG. 1.

As a laser light source (11A), a semi-conductor laser array with a laser light wave length of 640 nm was used. As a laser light source (11B), an SHG laser array with a laser light wave length of 530 nm was used. As a laser light source (11O), an SHG laser array with a laser light wave length of 460 nm was used. The size of the array of each laser light source was 4 mm×10 mm. A prism (15) was a right angled triangle prism, a triangle having inner angles of 30 degrees, 60 degrees, and 90 degrees. The long side was 20 mm. The short side was 11.5 mm. The height (which was the length in a direction vertical to a paper sheet showing FIG. 1) was 6 mm. The material was borosilicate glass (whose refraction index was 1.5). The frequency condition of the prism (15) was a linear reciprocating motion along a flat face where a slant face (laser light emitting face) of the prism was located. The amplitude ("s" in FIG. 3B) was 10 mm (the maximum distance in which laser light passed through the inside of the prism ("d" in FIG. 3 (B)) was 5 mm and a variation of the optical path length was 0 to 2.5 mm).

The frequency of the prism was changed according to Table 1 below, and subjective assessment with respect to the quality of the image projected on a screen was performed. The results are shown in Table 1, wherein a symbol "○" was marked when the assessment was conspicuous and identifiable, a symbol "Δ" was marked when it was a little conspicuous and could be easily identified, and a symbol "X" was marked when it was very conspicuous and easily identified.

TABLE 1

| Frequency of Vibration [Hz] | Result of Subjective Assessment |
|---|---|
| 0 | x |
| 10 | Δ |
| 20 | ○ |
| 30 | ○ |

As shown in the result, by vibrating the prism to perform a linear reciprocating motion along a flat face where a slant face that serves as a laser light emitting face of the prism is located, it was confirmed that a speckle noise reduction effect can be acquired. Furthermore, when the prism was vibrated at frequency of 20 Hz or more, it was confirmed that a still higher speckle noise reduction effect could be acquired. Moreover, when the light intensity on a screen was measured, a degree of decrease in light intensity with respect to the light intensity in case where the prism was not vibrated was approximately 95%. Thus, the brightness can be maintained.

The preceding description has been presented only to illustrate and describe exemplary embodiments of the present laser light source apparatus. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A laser light source apparatus comprising:
   a laser light source that emits a laser light;
   a prism including a plurality of sub-prisms arranged in a first direction,
      wherein each of the plurality of sub-prisms have a first optical flat face and a second optical flat face that form an apex angle,
      wherein the second optical flat face of each sub-prism is located on a first plane,
      wherein each first optical flat face of each sub-prism is located on a different parallel plane of a set of parallel planes, and
      wherein either the first plane or the set of parallel planes is perpendicular to an optical path of the laser light emitted from the laser light source; and
   a vibration driving device that vibrates the prism in a second direction that changes an optical path length in the prism of the laser light.

2. The laser light source apparatus according to claim 1, wherein the prism is vibrated so that laser light draws a circular trace on either the first optical flat face or the second optical flat face of any of the plurality of sub-prisms.

3. A laser light source apparatus comprising:
   a laser light source that emits a laser light;
   a prism including a first optical flat face that is perpendicular to an optical path of the laser light and a second optical flat face that is not perpendicular to the optical path of the laser light; and
   a vibration driving device that vibrates the prism a direction parallel to a direction where an optical path length in the prism of the laser light changes,
      wherein the laser light source is a plurality of laser light sources that respectively emit a plurality of laser lights with parallel optical paths that enter the prism.

4. The laser light source apparatus according to claim 1, further comprising:
   a condensing lens that condenses the laser light emitted from the prism.

5. A laser light source apparatus comprising:
   a laser light source that emits a laser light;

a prism including a first optical flat face that is perpendicular to an optical path of the laser light and a second optical flat face that is not perpendicular to the optical path of the laser light;

a vibration driving device that vibrates the prism in a direction parallel to a direction where an optical path length in the prism of the laser light changes; and a condensing lens that condenses the laser light emitted from the prism.

6. The laser light source apparatus according to claim 5, wherein the laser light source is a plurality of laser light sources that respectively emit a plurality of laser lights with parallel optical paths that enter the prism.

* * * * *